United States Patent
Anders et al.

(10) Patent No.: US 11,263,323 B2
(45) Date of Patent: Mar. 1, 2022

(54) SYSTEMS AND METHODS FOR INCREASING ROBUSTNESS OF MACHINE-LEARNED MODELS AND OTHER SOFTWARE SYSTEMS AGAINST ADVERSARIAL ATTACKS

(71) Applicant: Google LLC, Mountain View, CA (US)

(72) Inventors: Pedro Gonnet Anders, Zurich (CH); Philippe Gervais, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 568 days.

(21) Appl. No.: 16/262,178

(22) Filed: Jan. 30, 2019

(65) Prior Publication Data
US 2020/0201993 A1 Jun. 25, 2020

Related U.S. Application Data

(60) Provisional application No. 62/781,767, filed on Dec. 19, 2018.

(51) Int. Cl.
*G06F 21/56* (2013.01)
*G06N 20/00* (2019.01)
*G06K 9/62* (2022.01)

(52) U.S. Cl.
CPC ............ *G06F 21/56* (2013.01); *G06N 20/00* (2019.01); *G06F 2221/033* (2013.01); *G06K 9/6262* (2013.01)

(58) Field of Classification Search
CPC ... G06F 21/56; G06F 2221/033; G06N 20/00; G06K 9/6262
See application file for complete search history.

(56) References Cited

U.S. PATENT DOCUMENTS

| | | |
|---|---|---|
| 7,958,068 B2 | 6/2011 | Smith et al. |
| 8,239,836 B1 | 8/2012 | Franz et al. |

(Continued)

OTHER PUBLICATIONS

Lamb et al, "Fortified Networks: Improving the Robustness of Deep Networks by Modeling the Manifold of Hidden Representations", pp. 1-11, https://arxiv.org/pdf/1804.02485.pdf, Apr. 2018 (Year: 2018).*

(Continued)

*Primary Examiner* — Hee K Song
(74) *Attorney, Agent, or Firm* — Dority & Manning, P.A.

(57) ABSTRACT

The present disclosure provides systems and methods that reduce vulnerability of software systems (e.g., machine-learned models) to adversarial attacks by increasing variety within the software system. In particular, a software system can include a number of subcomponents that interoperate using predefined interfaces. To increase variety within the software system, multiple, different versions of one or more of the subcomponents of the software system can be generated. In particular, the different versions of the subcomponent(s) can be different from each other in some way, while still remaining functionally equivalent (e.g., able to perform the same functions with comparable accuracy/success). A plurality of different variants of the software system can be constructed by mixing and matching different versions of the subcomponents. A large amount of variety can be exhibited by the variants of the software system deployed at a given time, thereby leading to increased robustness against adversarial attacks.

20 Claims, 7 Drawing Sheets

(56) References Cited

U.S. PATENT DOCUMENTS

| | | | |
|---|---|---|---|
| 9,450,972 | B2 | 9/2016 | Cruz Mota et al. |
| 9,477,757 | B1 | 10/2016 | Ning et al. |
| 10,832,660 | B2* | 11/2020 | Fazeldehkordi ........ G10L 15/02 |
| 2016/0217369 | A1 | 7/2016 | Annapureddy et al. |
| 2019/0228312 | A1* | 7/2019 | Andoni .................. G06F 17/18 |
| 2020/0042857 | A1* | 2/2020 | Fang ....................... G06N 3/08 |

OTHER PUBLICATIONS

Bhagoji et al., "Enhancing Robustness of Machine Learning Systems via Data Transformations", $52^{nd}$ Annual Conference on Information Sciences and Systems, Princeton, New Jersey, Mar. 21-23, 2018, 15 pages.

Czarnecki et al., "Mix & Match—Agent Curricula for Reinforcement Learning", arXiv: 1806.01780v1, Jun. 5, 2018, 12 pages.

Evtimov et al. "Robust Physical-World Attacks on Deep Learning Models", arXiv:1707.08945v4, Sep. 13, 2017, 14 pages.

Lecuyer et al., "Certified Robustness to Adversarial Examples with Differential Privacy", arXiv:1802.03471v3, Oct. 7, 2018, 17 pages.

Liu et al., "Towards Robust Neural Networks via Random Self-Ensemble", arXiv:1712.00673v2, Aug. 1, 2018, 17 pages.

Srisakaokul et al., "MULDEF: Multi-Model-Based Defense Against Adversarial Examples for Neural Networks", arXiv:1809.00065v1, Aug. 31, 2018, 15 pages.

Yuan et al., "Adversarial Examples: Attacks and Defenses for Deep Learning", arXiv:1712.07107v3, Jul. 7, 2018, 20 pages.

\* cited by examiner

SYSTEMS AND METHODS FOR INCREASING ROBUSTNESS OF MACHINE-LEARNED MODELS AND OTHER SOFTWARE SYSTEMS AGAINST ADVERSARIAL ATTACKS

PRIORITY CLAIM

The present application is based on and claims priority to U.S. Provisional Application No. 62/781,767 having a filing date of Dec. 19, 2018. Applicant claims priority to and the benefit of each of such application and incorporate all such application herein by reference in its entirety.

FIELD

The present disclosure relates generally to software systems such as, for example, machine-learned models. More particularly, the present disclosure relates to systems and methods for reducing vulnerability of software systems such as machine-learned models to adversarial attacks or other malicious activity.

BACKGROUND

In many instances of different software systems used throughout the world there exists only very little variety. As one example, the vast majority of smartphones around the world use one of only a very limited number of different operating systems. As a consequence of this lack of variety, an adversarial attack that successfully exploits a single vulnerability in any one of these limited number of operating systems can adversely affect a significant fraction of smartphones worldwide.

There is a similar problem with the use of machine-learned models. In particular, only a limited number of models are deployed on a large number of devices such as smartphones or smart speakers to perform various functions such as, for example, image detection, voice recognition, hotword recognition, etc. As a consequence of this lack of variety of machine-learned models deployed "in the wild," a malicious actor that designs an adversarial attack that exploits a specific minor detail of a single model will be able to affect a large number of devices simply because the same model is used in so many devices.

One example type of adversarial attack against machine-learned models uses adversarial examples. Adversarial examples are inputs that, while appearing to be normal, are designed to cause a model to provide an incorrect output. In particular, given a correctly classified input (e.g., input image), a small perturbation to the input can make an otherwise-accurate neural network misclassify the perturbed input. Attack algorithms that leverage adversarial examples seek to minimize the perturbation while achieving the misclassification and, therefore, adversarial examples are difficult to distinguish from the unperturbed input. One specific example of use of an adversarial attack may be to trick an image recognition system, which may be used, for example, for mobile device security. For example, the adversarial attack may attempt to trick the image recognition system into inaccurately recognizing an adversarial input image as depicting a particular subject such as, for example, the face of a user of the mobile device.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to produce a machine-learned model with reduced vulnerability to adversarial attacks. The method includes obtaining, by one or more computing devices, data descriptive of an architecture of the machine-learned model. The machine-learned model includes a plurality of model subcomponents. The method includes generating, by the one or more computing devices, at least two different subcomponent variants for each of one or more of the plurality of model subcomponents. The method includes generating, by the one or more computing devices, a plurality of different model variants that include combinations of different ones of the at least two subcomponent variants for each of the one or more of the plurality of model subcomponents. The method includes training, by the one or more computing devices, the plurality of different model variants on a training dataset.

Another example aspect of the present disclosure is directed to one or more non-transitory computer-readable media that collectively store instructions that, when executed by one or more processors, cause one or more computing devices to perform operations. The operations include obtaining data descriptive of a plurality of model subcomponents of a machine-learned model. At least two subcomponent variants exist for each of one or more of the plurality of model subcomponents. The operations include, for each of a plurality of different clients: selecting one of the subcomponent variants respectively for each of the one or more of the plurality of model subcomponents; combining the selected subcomponent variants to produce one of a plurality of different model variants; and supplying the produced model variant to the client. In such fashion, the plurality of different clients respectively receive the plurality of different model variants for concurrent use by the plurality of different clients.

Another example aspect of the present disclosure is directed to a computing system that produces a software system with improved robustness against adversarial attacks. The software system has a plurality of subcomponents that interoperate using predefined interfaces. The computing system includes one or more processors and one or more non-transitory computer-readable media that collectively store instructions that, when executed by the one or more processors, cause the computing system to perform operations. The operations include generating at least a first version and a second version of a first subcomponent of the software system, wherein the second version is different from the first version. The operations include generating a first variant of the software system that includes the first version of the first subcomponent but not the second version of the first subcomponent. The operations include deploying the first variant of the software system at a first computing device. The operations include generating a second variant of the software system that includes the second version of the first subcomponent but not the first version of the first subcomponent. The operations include deploying the second variant of the software system at a second computing device for usage by the second computing device concurrently with usage of the first variant of the software system by the first computing device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
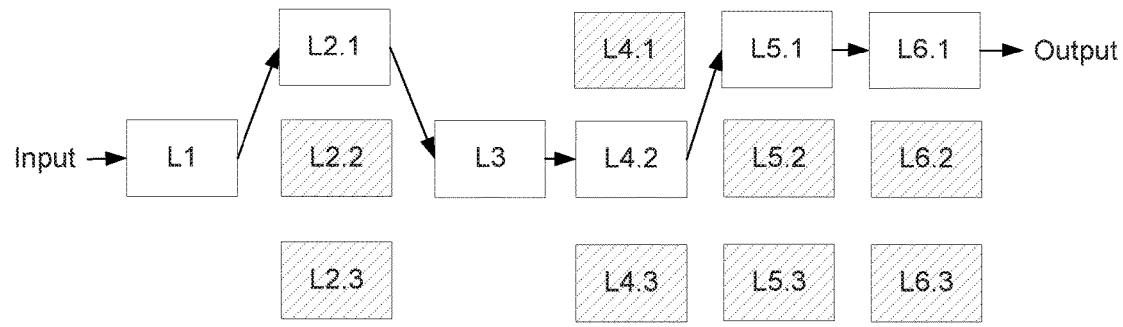
FIGS. 1A-C depict example model variants of a machine-learned model according to example embodiments of the present disclosure.

Reference numerals that are repeated across plural figures are intended to identify the same features in various implementations.

DETAILED DESCRIPTION

Overview

Generally, the present disclosure is directed to systems and methods that reduce vulnerability of software systems (e.g., machine-learned models, operating systems, or applications) to adversarial attacks by increasing variety within multiple instances of a particular software system. In particular, a software system can include a number of subcomponents that interoperate using predefined interfaces. As one example, a machine-learned model can include a number of layers that pass information from layer to layer using defined structures. To increase variety within the software system, multiple, different versions of one or more of the subcomponents of the software system can be generated (e.g., trained). In particular, the different versions of the subcomponent(s) can be different from each other in some way, while still remaining functionally equivalent (e.g., able to perform the same functions with comparable accuracy/success). As a result, a plurality of different variants of the software system can be constructed by mixing and matching different versions of the subcomponents. As an example, a first variant of the software system can include a first version of a first subcomponent but not a second, different version of the first subcomponent while a second variant of the software system can include the second version of the first subcomponent but not the first version of the first subcomponent. Further to this example, as different versions of additional subcomponents are introduced, a large number of different system variants can be constructed (e.g., the number of possible variants can grow exponentially as different versions of additional subcomponents are introduced). According to an aspect of the present disclosure, different variants of the software system can be respectively deployed at and/or for different clients for respective and concurrent use by and/or for the clients. For example, clients can include distinct computing systems (e.g., physically distinct computing devices) or can include different clients on the same device (e.g., different client applications that interact with a centralized machine-learning system such as an artificial intelligence assistant). In such fashion, a large amount of variety can be exhibited by the variants of the software system deployed at a given time, thereby leading to increased robustness against (i.e., decreased vulnerability to) adversarial attacks.

Thus, variety can be added to a software system by varying the implementations of each component by, for example, using completely different implementations of the same component, using different versions of the same component, and/or fuzzing/reordering the code of the component at compile time. In particular, in one example, given a system with N distinct components and $n_k$ variants of the kth component, $n_1 \cdot n_2 \cdot \ldots \cdot n_N$ distinct system variants can be built and deployed. Each of these system variants performs the same task, but in slightly distinct ways. Any attack (e.g., a virus or security exploit) targeting a specific implementation of the kth of the N components will only affect $1/n_k$ systems deployed. Similarly, any attack which relies on flaws in the specific implementation of more than one component (which is a more realistic scenario), such as, for example, implementations of both the jth and kth component, will only affect $1/(n_j \cdot n_k)$ of all deployed systems. As such, the systems and methods of the present disclosure present specific techniques which improve the way computers operate and, more specifically, improve computer security.

More particularly, most software systems can be seen as several distinct subcomponents interacting with each other via well-defined interfaces such as, for example, application programming interfaces (APIs). The specific implementation details of each subcomponent are typically not significantly important so long as the subcomponent both performs sufficiently well and also respects the interface (e.g., API). Example software systems can include machine-learned models, computer programs such as computer applications (e.g., mobile applications, browser applications, etc.), operating systems, and/or various other systems which rely on a combination of subcomponents.

Machine-learned models can also be viewed as a collection of subcomponents. As examples, the subcomponents of a model can correspond to different layers (e.g., fully-connected layers, RNN Layers, and/or convolution layers) connected to form a network, different blocks of one or more layers (e.g., convolutional blocks such as depthwise separable blocks, inverted bottleneck blocks, residual blocks, or the like), arbitrary or learned groupings or partitions of parameters of the model, or other divisions of the model into subcomponents. Although the discussion that follows will focus on applications of aspects of the present disclosure to machine-learned models, the techniques and concepts described herein are equally applicable to other systems that include multiple subcomponents that interoperate using defined interfaces and application to such other systems is included within the scope of this disclosure.

According to an aspect of the present disclosure, to increase variety within a machine-learned model, multiple, different versions of one or more of the subcomponents (e.g., layers) of the model can be generated and trained. In particular, the different versions of the subcomponent(s) can be different from each other in some way, while still remaining functionally equivalent (e.g., able to perform the same functions with comparable accuracy/success). As one example, two versions of the same model subcomponent (e.g., layer) can be functionally equivalent if they can be interchanged without affecting the performance of the model (e.g., accuracy, recall, and/or precision, etc.) by more than some threshold percentage (e.g., 5%, 1%, 0.5%, etc.). The same principle is true for referring to subcomponents of a software system as functionally equivalent. That is, different versions of a system subcomponent can be functionally equivalent if they can be interchanged without affecting the performance of the system by more than a desired degree.

The different versions of the model subcomponent(s) can have various different characteristics and/or can be generated in various different fashions. In one example, two or more of the different subcomponent variants for a given subcomponent (e.g., two different versions of the same layer) can have an identical architecture (e.g., identical structure such as number of neurons, connections between neurons, etc.), but can have different parameter values. For example, one technique to achieve this result is to simply train the two or more different subcomponent variants on different subsets of the training data. Since the training data is different, the two or more different subcomponent variants can converge to two or more different solutions which have different parameter values. Alternatively or additionally, the two or more different subcomponent variants can be initialized with different initial values and then trained on the same or different training data. Even when trained on the same training data, if initialized with different initial values, the two or more different subcomponent variants can converge to two or more different solutions which have different parameter values.

In other implementations, two or more different subcomponent variants for a given subcomponent (e.g., two different versions of the same layer) can have differing architectures. For example, the two or more different subcomponent variants can have a different number of neurons, different number of parameters, different connections, different activation types, different number of vertical silos, different recurrent cell type, different convolutional structure, and/or other differences. Thus, in one example, a first version of a particular model subcomponent (e.g., layer) in a recurrent neural network can include one or more long short-term memory (LSTM) cells while a second version of the particular model subcomponent can include one or more gated recurrent unit (GRU) cells.

According to another aspect of the present disclosure, a plurality of different model variants can be generated that include combinations of different ones of the different versions of the one or more subcomponents of the model. Stated differently, the different versions of the model subcomponents can be mixed and matched to create different model variants.

The different model variants can be trained on a training dataset. For example, in some implementations, the plurality of different model variants can be trained on different respective subsets of the training dataset. The different subsets can be overlapping and/or non-overlapping. In one example, the different respective subsets of the training dataset can correspond to respective batches of training data included in the training dataset. Thus, in some implementations, instead of training a single model with a single set of weights/parameters for each subcomponent (e.g., layer), several variants of the weights/parameters for each subcomponent (e.g., layer) can be trained.

More particularly, in some implementations, to train the plurality of different model variants, a training system can select a different combination of subcomponent versions at each of a plurality of training iterations. To provide a simplified example, given a network consisting of three convolutional layers C1, C2, and C3, followed by a fully-connected layer F, three variants of each layer can be established: $C1_1, C1_2, C1_3$; $C2_1, C2_2, C2_3$; $C3_1, C3_2, C3_3$; and $F_1, F_2, F_3$. At each training step (e.g., each training iteration that operates on a batch of the training data), a different configuration can be selected and combined and then trained on some portion of a training dataset. As examples, variants might include e.g. $C1_2, C2_1, C3_1, F_2$ for the first batch, $C1_1, C2_1, C3_2, F_3$ for the second batch, and so on (in this simplified example there are 81 possible combinations). The different combination of subcomponent versions can be selected at each instance in a random fashion, in a pseudo-random fashion, according to a heuristic, and/or according to a schedule.

When training has converged, any combination of the trained versions of each model subcomponent should produce similarly good results, but the resulting combined models will differ in their exploitability to adversarial attack.

Thus, when the model is deployed, one of the model variants can be provided to and/or used for each client. For example, at the time of model deployment, a combination of model subcomponents can be selected and combined to produce a model variant to be deployed. Deploying the model variant can include sending the model variant to a client for implementation by the client or implementing the model variant on behalf of the client and providing the client with an output (e.g., inference) produced by the model variant. Again, the different combination of subcomponent versions can be selected at each instance in a random fashion, in a pseudo-random fashion, according to a heuristic, and/or according to a schedule.

As a result of the above process, the model in general can exhibit much greater variety "in the wild." Therefore, a malicious actor, even if successful, can train adversarial samples that will affect only a small fraction of the deployed models. In addition, the security benefits provided by the present disclosure are not contingent upon knowledge about the type of attacks, since no matter how an attack works, it will only affect a fraction of deployed systems/models.

As indicated above, although portions of the description provided herein are focused on applications of aspects of the present disclosure to machine-learned models, the techniques and concepts described herein are equally applicable to other systems that include multiple subcomponents that interoperate using defined interfaces.

As another example, the techniques and concepts described herein can be applied to other software systems such as an operating system, an application (e.g., a browser application), or other software systems or software stacks. In particular, multiple versions of one or more subcomponents of the system can be produced to generate multiple variants of the system. To provide an example, subcomponents of a browser application include a Javascript engine, a renderer, an HTTP library, a security layer, and other subcomponents. Subcomponents of an operating system can include respective subcomponents that perform process management; memory management; I/O device management; file management; protection of resources, users, mechanisms, etc.; network management; network services; user interface handling; etc.

In one example, different versions of a software subcomponent can be generated by altering or newly creating source code for the software subcomponent so that two different versions with different source code are generated. In another example, a single set of source code for a subcomponent can be compiled using two different compilers, which will result in two different versions with different object code.

The systems and method of the present disclosure provide a number of technical effects and benefits. As one example, the systems and method of the present disclosure increase computer security by increasing robustness of software systems against adversarial attacks. Thus, computing systems modified as described herein may show improved performance and reduced downtime.

As another example technical effect and benefit, the systems and method of the present disclosure can increase the robustness of machine-learned models against adversarial attacks without requiring the creation of a large number of wholly different models or model ensembles. More particularly, one possible, alternative technique for reducing model vulnerability to adversarial attacks is to create a large number of wholly different models and to deploy the different models to different devices. However, this technique will result in an extreme increase in the amount of memory needed to store all of the models. For example, under this naive technique, to generate 81 wholly different models, then 81 different models—each with their own separate set of parameters—will need to be trained and stored, thereby increasing the number of parameters and associated memory requirements by 81×. In contrast, referring again to the simplified 4-layer example provided above, 81 different model variants can be obtained via different combinations of the different versions of the model subcomponents according to the techniques described herein. Thus, in the simplified 4-layer example provided above, the number of parameters and associated memory requirements is only increased by 3×, while still obtaining 81 different model variants. The actual parameter expansion number will likely be much less than 3×, since some implementations may have model subcomponents that are the same across different model variants (e.g., not every single subcomponent (e.g., layer) of the model is varied). Thus, by leveraging the power of combinatorics, the number of different model variants can be exponentially increased without a corresponding exponential increase in the number of parameters to train/store.

As another example technical effect and benefit, the systems and methods of the present disclosure can increase the robustness of machine-learned models against adversarial attacks without adding additional parameters to a single deployed-instance of the model. More particularly, one possible, alternative technique for reducing model vulnerability to adversarial attacks is to add a noise layer to the model, where the nodes of the noise layer supply random noise to downstream nodes at inference/training. However, this possible technique increases the number of parameters included in the deployed-instance of the model. This increased number of parameters can require additional memory space to be allocated to store the model, can require additional processing resources be allocated to run the model, and/or can increase the latency associated with running the model (i.e., slower inference speed). In instances in which the model is implemented in a resource-constrained environment such as a mobile device, embedded device, internet of things device, edge device, battery-operated device, etc., even a small increase in the number of parameters can have deleterious effects. In contrast to the introduction of an additional noise layer, the systems and method of the present disclosure can increase robustness of the model against attacks without adding additional parameters to the model. Stated differently, the systems and method of the present disclosure can increase robustness by increasing variety within deployed-instances of the model, and do not require the addition of new parameters, neurons, layers, or the like to achieve their effect.

As another example technical effect and benefit, the systems and methods of the present disclosure better enable the tracking and identification of the source of a given machine-learned model. For example, each model variant can have a unique structure, architecture, and/or set of parameter values. This can enable identification of this particular model variant relative to the other model variants and, more generally, relative to other, unrelated machine-learned models. This ability to identify the model variant, when combined with a large number of available model variants, can enable a particular model variant to be assigned to or otherwise associated with one or more specific sources and/or one or more specific recipients. As one example, an entity that creates and deploys models as a service can generate N different model variants and assign and deploy each model to a respective one of N different clients. Thereafter, if the entity observes usage of the ith model variant by a party other than the ith client to which such model variant has been assigned/deployed, the entity can assume that such usage is unauthorized. Thus, aspects of the present disclosure enable more efficient tracking and auditing of model version usage, which otherwise might require additional allocation of computing resources.

With reference now to the Figures, example embodiments of the present disclosure will be discussed in further detail.

Example Machine-Learned Model with Multiple Model Variants

Figure 1B:
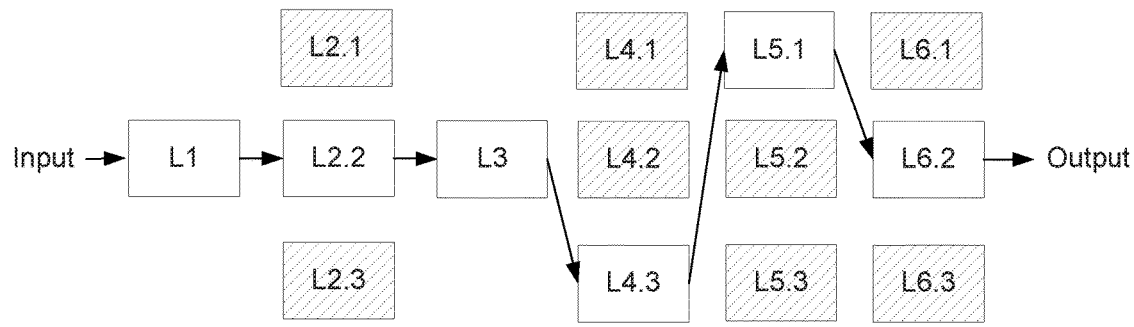
Figure 1C:
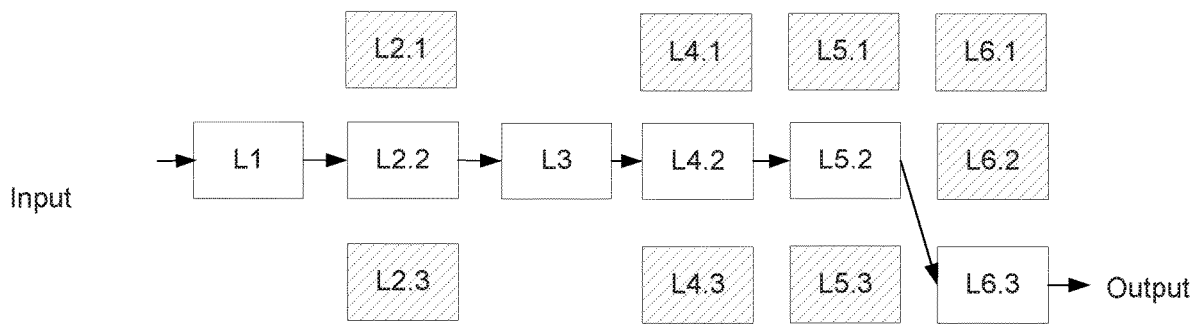

FIGS. 1A-C depict example model variants of a machine-learned model according to example embodiments of the present disclosure. In particular, the machine-learned model illustrated in FIGS. 1A-C includes six layers (L1, L2, . . . , L6) in a sequence one after the other.

According to aspects of the present disclosure, multiple, different versions of at least one of the layers can be generated. For example, as illustrated in FIGS. 1A-C, three versions of layer L2 have been generated (L2.1, L2.2, L2.3). The same is true from layers L4, L5, and L6. Although three versions of each of layers L2, L4, L5, and L6 are illustrated, any number of different versions can be produced. The number of different versions does not need to match across each layer (e.g., layer L5 could have 15 different versions while L6 has 12 versions, etc.). More or fewer of the layers could be treated in this manner (e.g., multiple, different versions of layer L3 could be generated in addition or alternatively to the multiple, different versions of layer L2, etc.).

Generating multiple, different, yet functionally equivalent versions of layers in this manner enables the production of multiple, different variants of the machine-learned model. For example, FIGS. 1A-C depict three different possible model variants. As illustrated, the blocks with hatching are not used by that particular model variant, while the blocks which have arrowed connections are used by that particular model variant. Although three different variants are illustrated, it will be recognized that these are simply examples and that, in fact, 81 different variants can be produced.

As a result, the machine-learned model as a whole will be less susceptible to adversarial activities. For example, an adversarial example targeting L4.3 will only affect ⅓ of the models deployed. Similarly, any attack which relies on flaws in both L4.3 and L5.1, will only affect ⅑ of all deployed models. As such, the systems and methods of the present disclosure improve machine-learned model security.

Although layers are used in the illustrated example as the subcomponents of the model for which multiple, different versions can be produced, this is for example only. Any different subportion of the model can serve as a subcomponent of the model for which multiple, different versions can be produced.

Example Devices and Systems

Figure 2A:
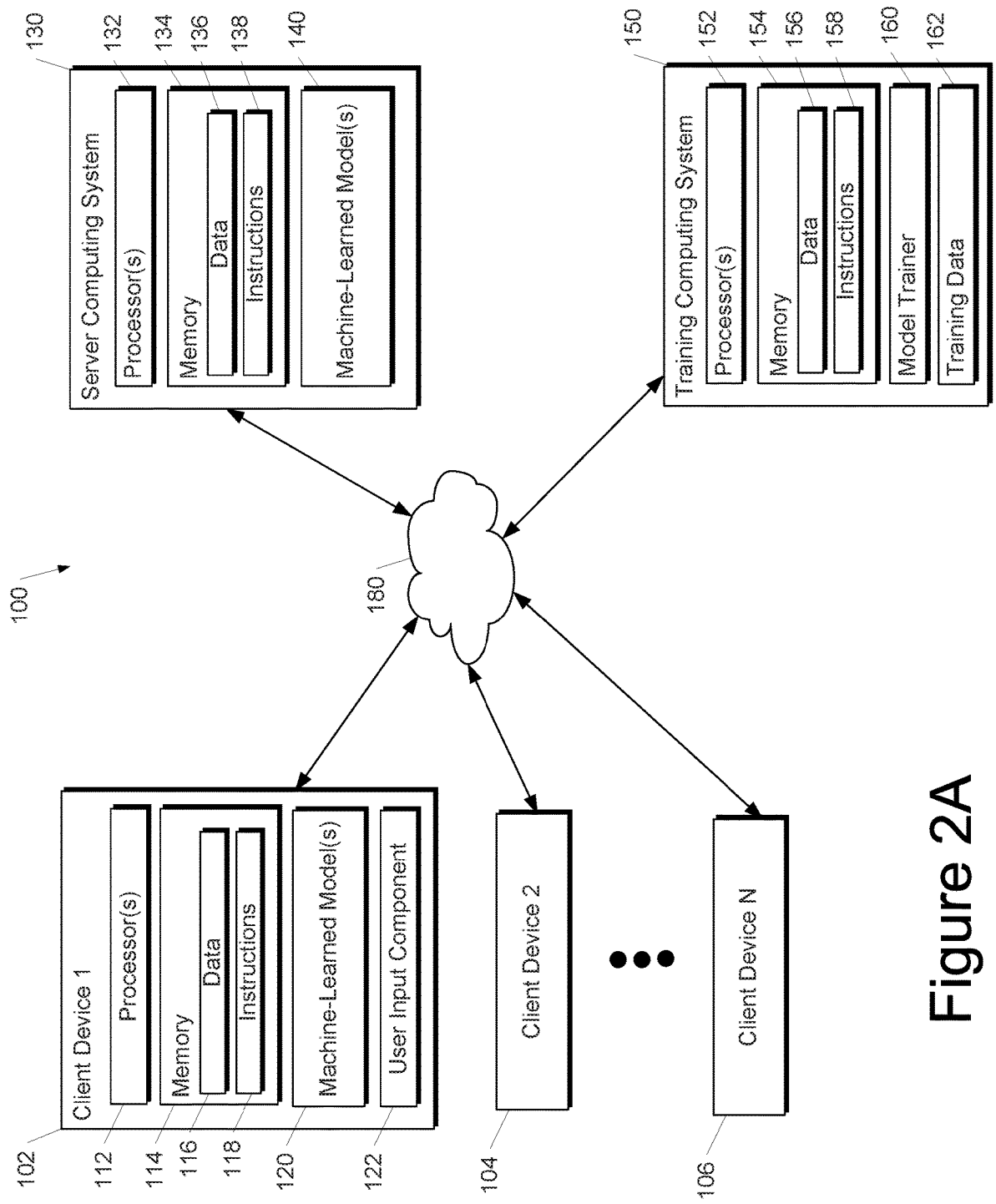
FIG. 2A depicts a block diagram of an example computing system according to example embodiments of the present disclosure.

FIG. 2A depicts a block diagram of an example computing system 100 according to example embodiments of the present disclosure. The system 100 includes multiple client devices 102, 104, 106, a server computing system 130, and a training computing system 150 that are communicatively coupled over a network 180.

The client device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. The client devices 104 and 106 can be the same as or similar to the more specifically illustrated device 102.

The client device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the client device 102 to perform operations.

In some implementations, the client device 102 can store or include one or more machine-learned models 120. For example, the machine-learned models 120 can be or can otherwise include various machine-learned models such as neural networks (e.g., deep neural networks), decision tree-based models (e.g., random forests), support vector machines, or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 1A-C.

In some implementations, the one or more machine-learned models 120 can be received from the server computing system 130 over network 180, stored in the client device memory 114, and then used or otherwise implemented by the one or more processors 112. In some implementations, the client device 102 can implement multiple parallel instances of a single machine-learned model 120.

Additionally or alternatively, one or more machine-learned models 140 can be included in or otherwise stored and implemented by the server computing system 130 that communicates with the client device 102 according to a client-server relationship. For example, the machine-learned models 140 can be implemented by the server computing system 140 as a portion of a web service. Thus, one or more models 120 can be stored and implemented at the client device 102 and/or one or more models 140 can be stored and implemented at the server computing system 130.

In some implementations, the server computing system 130 can store or otherwise include multiple, different variants of the machine-learned models 140 while, in some implementations, each client device (e.g., 102) receives and uses only a single variant of each machine-learned model 120.

The client device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks, decision tree-based models (e.g., random forests), support vector machines, or other models, including linear models and/or non-linear models. Example neural networks include feed forward neural networks, deep neural networks, recurrent neural networks, and convolutional neural networks. Example models 140 are discussed with reference to FIGS. 1A-C.

The client device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the client device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, multiple batches of training data. The model trainer 160 can perform any of the training techniques described herein.

In some implementations, if the user has provided consent, the training examples can be provided by the client device 102. Thus, in such implementations, the model 120 provided to the client device 102 can be trained by the training computing system 150 on user-specific data received from the client device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A illustrates one example computing system that can be used to implement the present disclosure. Other computing systems can be used as well. For example, in some implementations, the client device 102 can include the model trainer 160 and the training dataset 162. In such implementations, the models 120 can be both trained and used locally at the client device 102. In some of such implementations, the client device 102 can implement the model trainer 160 to personalize the models 120 based on user-specific data.

Figure 2B:
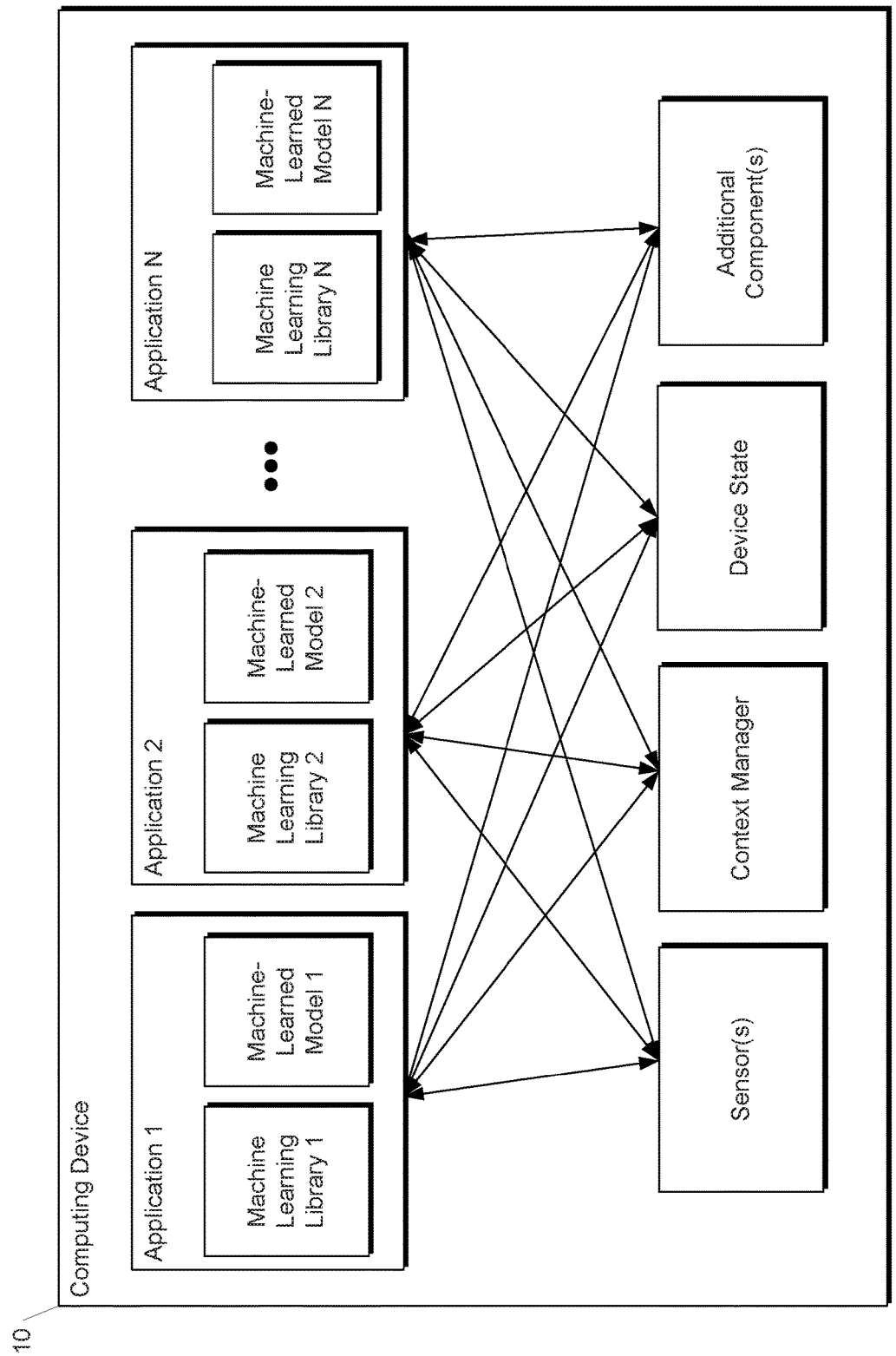
FIG. 2B depicts a block diagram of an example computing device according to example embodiments of the present disclosure.

FIG. 2B depicts a block diagram of an example computing device 10 that performs according to example embodiments of the present disclosure. The computing device 10 can be a client device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
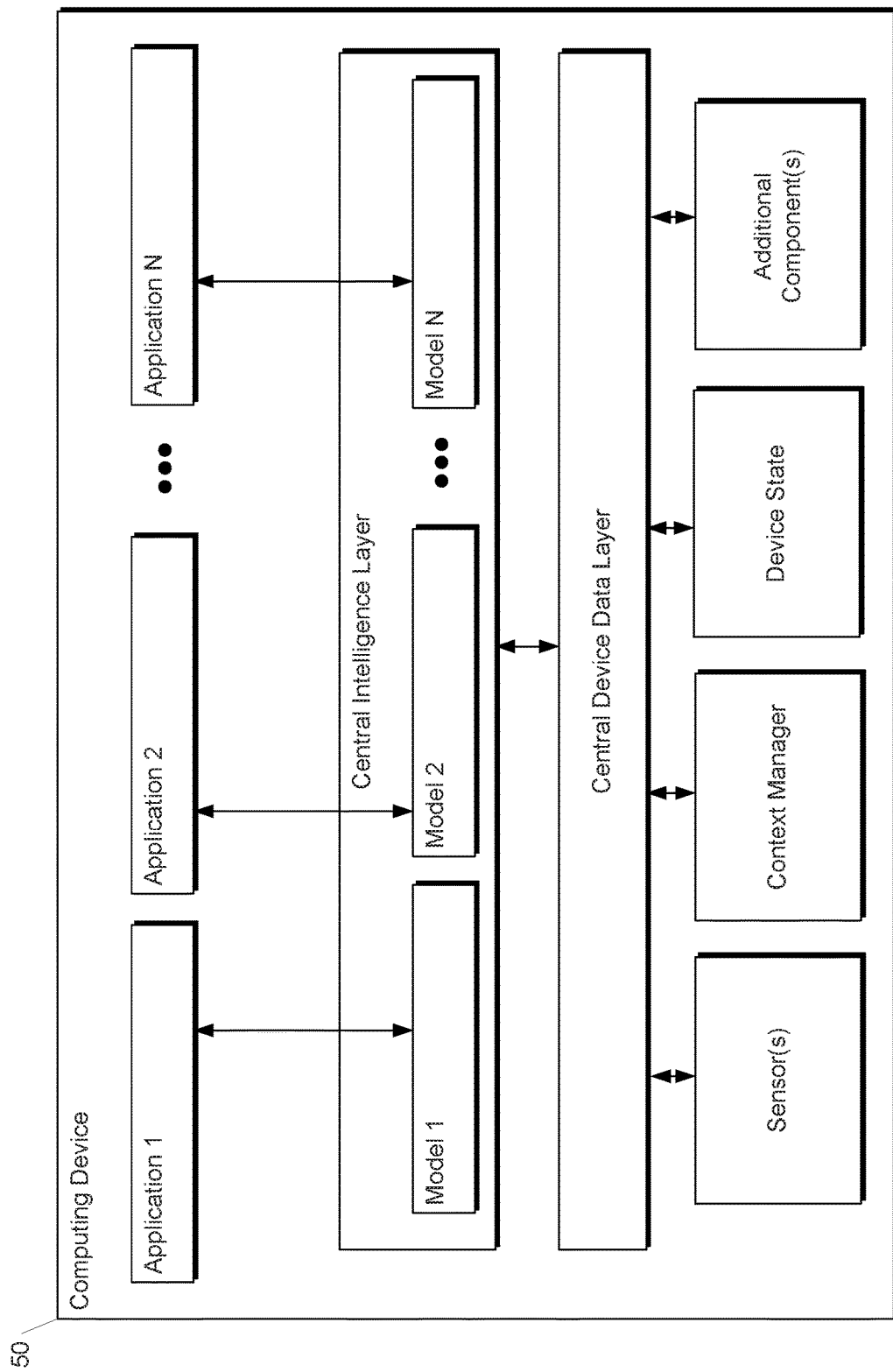
FIG. 2C depicts a block diagram of an example computing device according to example embodiments of the present disclosure.

FIG. 2C depicts a block diagram of an example computing device 50 that performs according to example embodiments of the present disclosure. The computing device 50 can be a client device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 3:
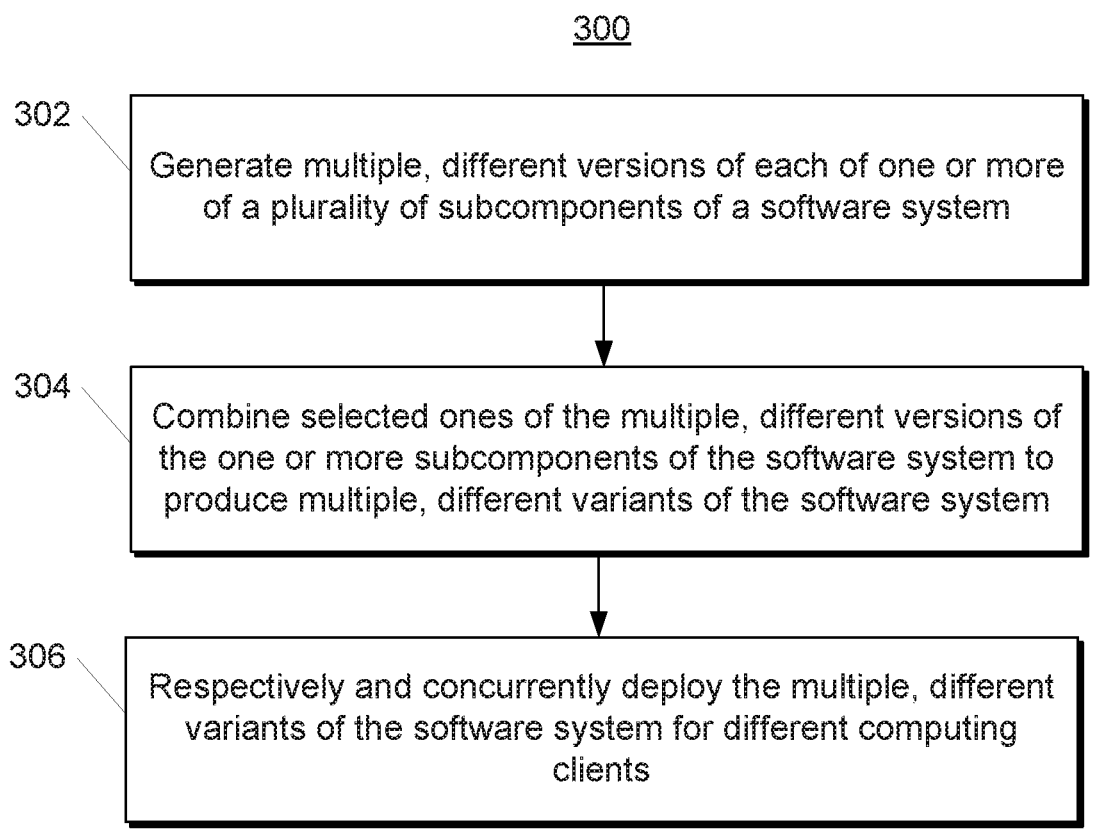
FIG. 3 depicts a flow chart diagram of an example method to improve robustness of a software system against adversarial attacks according to example embodiments of the present disclosure.

FIG. 3 depicts a flow chart diagram of an example method 300 to improve robustness of a software system against adversarial attacks according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system generates multiple, different versions of each of one or more of a plurality of subcomponents of a software system. More particularly, most software systems can be seen as several distinct subcomponents interacting with each other via well-defined interfaces such as, for example, application programming interfaces (APIs). The specific implementation details of each subcomponent are typically not significantly important so long as the subcomponent both performs sufficiently well and also respects the interface (e.g., API). Example software systems can include machine-learned models, computer programs such as computer applications (e.g., mobile applications, browser applications, etc.), operating systems, and/or various other systems which rely on a combination of subcomponents.

To increase variety within the software system, multiple, different versions of one or more of the subcomponents of the software system can be generated. In particular, the different versions of the subcomponent(s) can be different from each other in some way, while still remaining functionally equivalent (e.g., able to perform the same functions with comparable accuracy/success).

In one example, different versions of a software subcomponent can be generated by altering or newly creating source code for the software subcomponent so that two different versions with different source code are generated. In another example, a single set of source code for a subcomponent can be compiled using two different compilers, which will result in two different versions with different object code.

At 304, the computing system combines selected ones of the multiple, different versions of the one or more subcomponents of the software system to produce multiple, different variants of the software system. Thus, a plurality of different variants of the software system can be constructed by mixing and matching different versions of the subcomponents. As an example, a first variant of the software system can include a first version of a first subcomponent but not a second, different version of the first subcomponent while a second variant of the software system can include the second version of the first subcomponent but not the first version of the first subcomponent. Further to this example, as different versions of additional subcomponents are introduced, a large number of different system variants can be constructed (e.g., the number of possible variants can grow exponentially as different versions of additional subcomponents are introduced). The different combination of subcomponent versions can be selected at each instance in a random fashion, in a pseudo-random fashion, according to a heuristic, and/or according to a schedule.

At 306, the computing system respectively and concurrently deploys the multiple, different variants of the software system for different computing clients. Thus, different variants of the software system can be respectively deployed at and/or for different clients for respective and concurrent use by and/or for the clients. For example, clients can include distinct computing systems (e.g., physically distinct computing devices) or can include different clients on the same device (e.g., different client applications that interact with a centralized machine-learning system such as an artificial intelligence assistant). In such fashion, a large amount of variety can be exhibited by the variants of the software system deployed at a given time, thereby leading to increased robustness against (i.e., decreased vulnerability to) adversarial attacks.

In some implementations, when the software system is deployed, one of the system variants can be provided to and/or used for each client. For example, at the time of system deployment, a combination of system subcomponents can be selected and combined to produce a system variant to be deployed. Deploying the system variant can include sending the system variant to a client for implementation by the client or implementing the system variant on behalf of the client and providing the client with an output produced by the system variant.

To provide an example, the techniques and concepts described herein can be applied to software systems such as an operating system, an application (e.g., a browser application), or other software systems or software stacks. In particular, multiple versions of one or more subcomponents of the system can be produced to generate multiple variants of the system. As one example, subcomponents of a browser application include a Javascript engine, a renderer, an HTTP library, a security layer, and other subcomponents. Subcomponents of an operating system can include respective subcomponents that perform process management; memory management; I/O device management; file management; protection of resources, users, mechanisms, etc.; network management; network services; user interface handling; etc.

Thus, variety can be added to a software system by varying the implementations of each component by, for example, using completely different implementations of the same component, using different versions of the same component, and/or fuzzing/reordering the code of the component at compile time. In particular, in one example, given a system with N distinct components and $n_k$ variants of the kth component, $n_1 \cdot n_2 \cdot \ldots \cdot n_N$ distinct system variants can be built and deployed. Each of these system variants performs the same task, but in slightly distinct ways. Any attack (e.g., a virus or security exploit) targeting a specific implementation of the kth of the N components will only affect $1/n_k$ systems deployed. Similarly, any attack which relies on flaws in the specific implementation of more than one component (which is a more realistic scenario), such as, for example, implementations of both the jth and kth component, will only affect $1/(n_j \cdot n_k)$ of all deployed systems. As such, the systems and methods of the present disclosure present specific techniques which improve the way computers operate and, more specifically, improve computer security.

Figure 4:
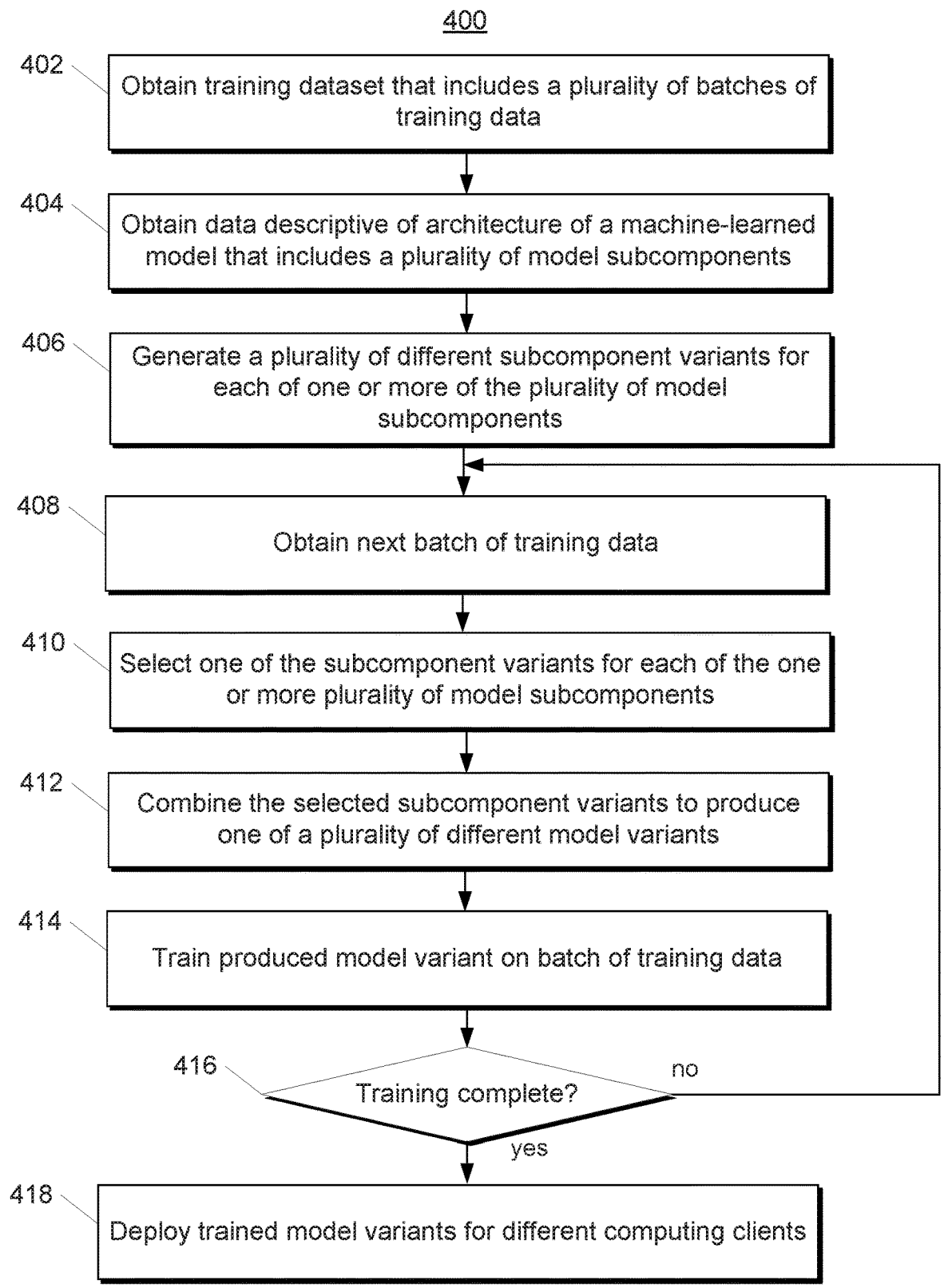
FIG. 4 depicts a flow chart diagram of an example method to generate and train a plurality of model variants of a machine-learned model according to example embodiments of the present disclosure.

FIG. 4 depicts a flow chart diagram of an example method 400 to generate and train a plurality of model variants of a machine-learned model according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system obtains a training dataset that includes a plurality of batches of training data. For example, the training data can include training examples that have been labeled with ground-truth labels.

At 404, the computing system obtains data descriptive of an architecture of a machine-learned model that includes a plurality of model subcomponents. Machine-learned models can be viewed as a collection of subcomponents. As examples, the subcomponents of a model can correspond to different layers (e.g., fully-connected layers, RNN Layers, and/or convolution layers) connected to form a network, different blocks of one or more layers (e.g., convolutional blocks such as depthwise separable blocks, inverted bottleneck blocks, residual blocks, or the like), arbitrary or learned groupings or partitions of parameters of the model, or other divisions of the model into subcomponents. Although the discussion that follows will focus on applications of aspects of the present disclosure to machine-learned models, the techniques and concepts described herein are equally applicable to other systems that include multiple subcomponents that interoperate using defined interfaces and application to such other systems is included within the scope of this disclosure.

At 406, the computing system generates a plurality of different subcomponent variants for each of one or more of the plurality of model subcomponents. To increase variety within a machine-learned model, multiple, different versions of one or more of the subcomponents (e.g., layers) of the model can be generated. In particular, the different versions of the subcomponent(s) can be different from each other in some way, while still remaining functionally equivalent (e.g., able to perform the same functions with comparable accuracy/success). As one example, two versions of the same model subcomponent (e.g., layer) can be functionally equivalent if they can be interchanged without affecting the performance of the model (e.g., accuracy, recall, and/or precision, etc.) by more than some threshold percentage (e.g., 5%, 1%, 0.5%, etc.). The same principle is true for referring to subcomponents of a software system as functionally equivalent. That is, different versions of a system subcomponent can be functionally equivalent if they can be interchanged without affecting the performance of the system by more than a desired degree.

The different versions of the model subcomponent(s) can have various different characteristics and/or can be generated in various different fashions. In one example, two or more of the different subcomponent variants for a given subcomponent (e.g., two different versions of the same layer) can have an identical architecture (e.g., identical structure such as number of neurons, connections between neurons, etc.), but can have different parameter values. For example, one technique to achieve this result is to simply train the two or more different subcomponent variants on different subsets of the training data. Since the training data is different, the two or more different subcomponent variants can converge to two or more different solutions which have different parameter values. Alternatively or additionally, the two or more different subcomponent variants can be initialized with different initial values and then trained on the same or different training data. Even when trained on the same training data, if initialized with different initial values, the two or more different subcomponent variants can converge to two or more different solutions which have different parameter values.

In other implementations, two or more different subcomponent variants for a given subcomponent (e.g., two different versions of the same layer) can have differing architectures. For example, the two or more different subcomponent variants can have a different number of neurons, different number of parameters, different connections, different activation types, different number of vertical silos, different recurrent cell type, different convolutional structure, and/or other differences. Thus, in one example, a first version of a particular model subcomponent (e.g., layer) in a recurrent neural network can include one or more long short-term memory (LSTM) cells while a second version of the particular model subcomponent can include one or more gated recurrent unit (GRU) cells.

Referring again to FIG. 4, at 408, the computing system obtains a next batch of training data.

At 410, the computing system selects one of the subcomponent variants for each of the one or more of the plurality of model subcomponents. The different combination of subcomponent versions can be selected at each instance of 410 in a random fashion, in a pseudo-random fashion, according to a heuristic, and/or according to a schedule.

At 412, the computing system combines the selected subcomponent variants to produce one of a plurality of different model variants. Thus, the different versions of the model subcomponents can be mixed and matched to create a different model variant.

At 414, the computing system trains the model variant produced at 412 on the batch of training data obtained at 408. At 416, the computing system determines whether training is complete. Training can be complete when one or more stopping criteria are met. The stopping criteria can be any number of different criteria including, as examples, a loop counter reaching a predefined maximum, an iteration over iteration change in parameter adjustments falling below a threshold, the gradient being below a threshold value, and/or various other criteria.

If it is determined at 416 that training is not complete, then method returns to 408 and obtains the next batch of training data. However, if it is determined at 416 that training is complete, then method 400 proceeds to 418 at deploys the trained model variants for different computing clients.

Figure 5:
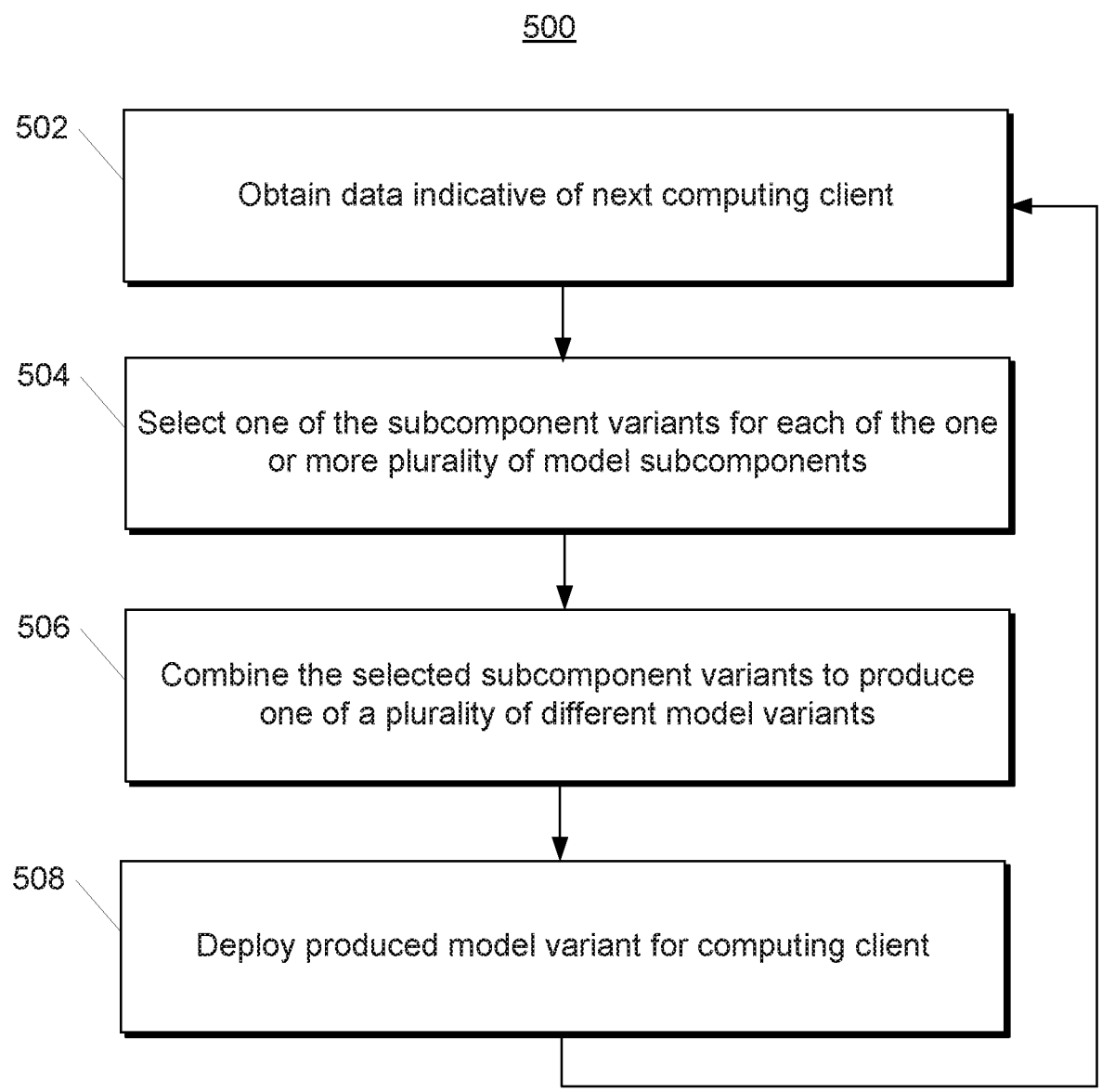
FIG. 5 depicts a flow chart diagram of an example method to deploy a plurality of model variants of a machine-learned model according to example embodiments of the present disclosure.

FIG. 5 depicts a flow chart diagram of an example method 500 to deploy a plurality of model variants of a machine-learned model according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system obtains data indicative of a next computing client. For example, clients can include distinct computing systems (e.g., physically distinct computing devices) or can include different clients on the same device (e.g., different client applications that interact with a centralized machine-learning system such as an artificial intelligence assistant).

At 504, the computing system selects one of the subcomponent variants for of the one or more of the plurality of model subcomponents. The different combination of subcomponent versions can be selected at each instance in a random fashion, in a pseudo-random fashion, according to a heuristic, and/or according to a schedule.

At 506, the computing system combines the selected subcomponent variants to produce one of a plurality of different model variants. Thus, the different versions of the model subcomponents can be mixed and matched to create a different model variant.

At 508, the computing system deploys the produced model variant for the computing client. Deploying the model variant can include sending the model variant to a client for implementation by the client or implementing the model variant on behalf of the client and providing the client with an output (e.g., inference) produced by the model variant.

After 508, the method 500 returns to 502 and obtains data indicative of the next computing client. As a result of the above process, the model in general can exhibit much greater variety "in the wild." Therefore, a malicious actor, even if successful, can train adversarial samples that will affect only a small fraction of the deployed models. In addition, the security benefits provided by the present disclosure are not contingent upon knowledge about the type of attacks, since no matter how an attack works, it will only affect a fraction of deployed systems/models.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Additional example aspects of the present disclosure are directed to a computing system that produces a software system with improved robustness against adversarial attacks. The software system can include a plurality of subcomponents that interoperate using predefined interfaces. The computing system can include one or more processors and one or more non-transitory computer-readable media that collectively store instructions that, when executed by the one or more processors, cause the computing system to perform operations. The operations can include generating at least a first version and a second version of a first subcomponent of the software system, wherein the second version is different from the first version. The operations can include generating a first variant of the software system that includes the first version of the first subcomponent but not the second version of the first subcomponent. The operations can include deploying the first variant of the software system at a first computing device. The operations can include generating a second variant of the software system that includes the second version of the first subcomponent but not the first version of the first subcomponent. The operations can include deploying the second variant of the software system at a second computing device for usage by the second computing device concurrently with usage of the first variant of the software system by the first computing device.

In some implementations, the first version and the second version of the first subcomponent of the software system can be functionally equivalent and interoperate with a remainder of the software system using a same predefined interface.

In some implementations, generating the first variant and the second variant of the software system can include randomly selecting and combining a plurality of alternative versions of the plurality of subcomponents of the software system.

In some implementations, the first version of the first subcomponent of the software system can include a first set of source code and the second version of the first subcomponent of the software system can include a second set of source code that is different than the first set of source code.

In some implementations, generating at least the first version and the second version of the first subcomponent of the software system can include: obtaining a single set of source code for the first subcomponent of the software system; using a first compiler to compile the single set of source code to produce the first version of the first subcomponent, the first version comprising a first set of object code; and/or using a second compiler that is different than the first compiler to compile the single set of source code to produce the second version of the first subcomponent. The second version can include a second set of object code that is different than the first set of object code.

In some implementations, the software system can include a machine-learned model and the plurality of subcomponents comprise model subcomponents of the machine-learned model.

In some implementations, the software system can include a browser application.

In some implementations, the first subcomponent of the browser application can include: a Javascript engine; a renderer; an HTTP library; and/or a security layer.

In some implementations, the software system can include an operating system.

What is claimed is:

1. A computer-implemented method to produce a machine-learned model with reduced vulnerability to adversarial attacks, the method comprising:
    obtaining, by one or more computing devices, data descriptive of an architecture of the machine-learned model, wherein the machine-learned model comprises a plurality of model subcomponents;
    generating, by the one or more computing devices, at least two different subcomponent variants for each of one or more of the plurality of model subcomponents;
    generating, by the one or more computing devices, a plurality of different model variants that comprise combinations of different ones of the at least two subcomponent variants for each of the one or more of the plurality of model subcomponents; and
    training, by the one or more computing devices, the plurality of different model variants on a training dataset.

2. The computer-implemented method of claim 1, wherein training, by the one or more computing devices, the plurality of different model variants on the training dataset comprises respectively training, by the one or more computing devices, the plurality of different model variants on different respective subsets of the training dataset.

3. The computer-implemented method of claim 1, wherein generating and training the plurality of different model variants comprises:
    accessing, by the one or more computing devices, the training dataset for training the machine-learned model, wherein the training dataset comprises a plurality of batches of training data; and
    for each of a plurality of training iterations:
        selecting, by the one or more computing devices, one of the subcomponent variants respectively for each of the one or more of the plurality of model subcomponents;

combining, by the one or more computing devices, the selected subcomponent variants to produce one of the plurality of different model variants; and training, by the one or more computing devices, the produced model variant on at least one of the plurality of batches of training data included in the training dataset.

4. The computer-implemented method of claim 3, further comprising:

after the plurality of training iterations and for each of a plurality of different clients:

selecting, by the one or more computing devices, one of the subcomponent variants respectively for each of the one or more of the plurality of model subcomponents;

combining, by the one or more computing devices, the selected subcomponent variants to produce one of the plurality of different model variants; and deploying, by the one or more computing devices, the produced model variant for the respective client;

whereby the plurality of different model variants are respectively concurrently deployed for the plurality of different clients.

5. The computer-implemented method of claim 3, wherein, for each of the plurality of training iterations, selecting, by the one or more computing devices, one of the subcomponent variants respectively for each of the one or more of the plurality of model subcomponents comprises randomly selecting, by the one or more computing devices, one of the subcomponent variants respectively for each of the one or more of the plurality of model subcomponents.

6. The computer-implemented method of claim 1, wherein the machine-learned model comprises an artificial neural network and the plurality of model subcomponents comprise different layers of the artificial neural network.

7. The computer-implemented method of claim 1, wherein, for at least one of the one or more of the plurality of model subcomponents, the at least two different subcomponent variants have an identical architecture.

8. The computer-implemented method of claim 1, wherein, for at least one of the one or more of the plurality of model subcomponents, the at least two different subcomponent variants have an identical architecture but different initialized parameter values.

9. The computer-implemented method of claim 1, wherein, for at least one of the one or more of the plurality of model subcomponents, the at least two different subcomponent variants have different architectures.

10. The computer-implemented method of claim 9, wherein, for at least one of the one or more of the plurality of model subcomponents, the at least two different subcomponent variants have different respective numbers of parameters.

11. The computer-implemented method of claim 9, wherein, for at least one of the one or more of the plurality of model subcomponents, the at least two different subcomponent variants have different respective activation types.

12. The computer-implemented method of claim 9, wherein, for at least one of the one or more of the plurality of model subcomponents, the at least two different subcomponent variants have different respective numbers of vertical silos.

13. The computer-implemented method of claim 9, wherein:

the machine-learned model comprises an artificial recurrent neural network; and for at least one of the one or more of the plurality of model subcomponents, the at least two different subcomponent variants have different respective recurrent cell structures.

14. The computer-implemented method of claim 3, wherein at least two of the plurality of batches of training data are at least partially overlapping such that the at least two of the batches share a training example.

15. The computer-implemented method of claim 3, wherein the plurality of batches of training data are non-overlapping such that none of the batches share a training example.

16. One or more non-transitory computer-readable media that collectively store instructions that, when executed by one or more processors, cause one or more computing devices to perform operations, the operations comprising:

obtaining data descriptive of a plurality of model subcomponents of a machine-learned model, wherein at least two subcomponent variants exist for each of one or more of the plurality of model subcomponents; and for each of a plurality of different clients:

selecting one of the subcomponent variants respectively for each of the one or more of the plurality of model subcomponents;

combining the selected subcomponent variants to produce one of a plurality of different model variants; and supplying the produced model variant to the client;

whereby the plurality of different clients respectively receive the plurality of different model variants for concurrent use by the plurality of different clients.

17. The one or more non-transitory computer-readable media of claim 16, wherein the operations further comprise training the plurality of different model variants on different respective subsets of a training dataset.

18. The one or more non-transitory computer-readable media of claim 16, wherein the operations further comprise:

accessing a training dataset for training the machine-learned model, wherein the training dataset comprises a plurality of batches of training data; and for each of a plurality of training iterations:

selecting one of the subcomponent variants respectively for each of the one or more of the plurality of model subcomponents;

combining the selected subcomponent variants to produce one of the plurality of different model variants; and training the produced model variant on at least one of the plurality of batches of training data included in the training dataset.

19. The one or more non-transitory computer-readable media of claim 18, wherein, for each of the plurality of training iterations, selecting, by the one or more computing devices, one of the subcomponent variants respectively for each of the one or more of the plurality of model subcomponents comprises randomly selecting, by the one or more computing devices, one of the subcomponent variants respectively for each of the one or more of the plurality of model subcomponents.

20. A computer system comprising one or more processors and one or more non-transitory computer-readable media that collectively store instructions that, when executed by one or more processors, cause one or more computing devices to perform operations, the operations comprising:

obtaining data descriptive of an architecture of a machine-learned model, wherein the machine-learned model comprises a plurality of model subcomponents;

generating at least two different subcomponent variants for each of one or more of the plurality of model subcomponents;

generating a plurality of different model variants that comprise combinations of different ones of the at least two subcomponent variants for each of the one or more of the plurality of model subcomponents;

training the plurality of different model variants on a training dataset; and respectively and concurrently deploying the plurality of different model variants for a plurality of different clients.

* * * * *